UNITED STATES PATENT OFFICE.

JOHN F. COLLINS, OF ALBANY, NEW YORK.

IMPROVEMENT IN SEPARATING WOOL FROM RAGS.

Specification forming part of Letters Patent No. 119,077, dated September 19, 1871.

*To all whom it may concern:*

Be it known that I, JOHN F. COLLINS, of Albany, in the county of Albany and State of New York, have invented a certain Process for Recovering the Woolen or Animal Fiber from Rags, which product is suitable to be remanufactured into merchantable fabric, of which process the following is a specification:

Take rags composed of cotton and of wool, a part of which have been dyed in logwood, and place them in a vessel containing a solution of sulphuric acid and salt, heated to a boiling temperature, and allow them to remain therein from seven to thirty minutes, according to the demands of the fabric; then remove them and rinse them in water, when the cotton fiber, destroyed by the action of the heated solution, will be cleansed from the woolen and taken up in the water, and the woolen residuum be left of an uniform claret color. If none of the rags to be subjected to this process have been previously colored by logwood, a small quantity of logwood added to the solution will, after the rags have been steeped in the new solution thus formed in the manner before specified, and duly rinsed in water, leave them of a uniform color. The time of steeping in the solution is varied according to the nature and body of the fabric, new fabrics usually demanding a longer time to destroy the cotton fiber than old ones. By this process rags of a mixed character are speedily cleansed of the cotton element, leaving the colored wool of a soft, unimpaired texture, of an uniform color, as ready for the manufacturer and as available as new wool.

I claim as my invention—

1. The process of recovering animal fiber from mixed rags, part of which have been dyed in logwood, hereinbefore described.

2. The process hereinbefore described of recovering and coloring animal fiber from rags of a mixed character, no portion of which have been dyed in logwood.

JOHN F. COLLINS.

Witnesses:
GEO. W. TIBBITTS.
JAMES A. WALES.

(10-)